United States Patent [19]

Sugawara

[11] Patent Number: 4,896,232

[45] Date of Patent: Jan. 23, 1990

[54] CHUCKING MECHANISM FOR FLOPPY DISK DRIVE

[75] Inventor: Katsuyuki Sugawara, Shiraishi, Japan

[73] Assignee: Alps Electric Co., Ltd., Tokyo, Japan

[21] Appl. No.: 206,457

[22] Filed: Jun. 13, 1988

[30] Foreign Application Priority Data

Aug. 27, 1987 [JP] Japan .................. 62-130464[U]

[51] Int. Cl.$^4$ .............................................. G11B 5/016
[52] U.S. Cl. .............................. 360/99.04; 360/99.08
[58] Field of Search ................ 360/99.08, 133, 99.04, 360/99.05, 99.12

[56] References Cited

U.S. PATENT DOCUMENTS 4,658,311 4/1987 Sakaguchi .................... 360/99.08

FOREIGN PATENT DOCUMENTS 60-205856 10/1985 Japan .............................. 360/99.08
60-217554 10/1985 Japan .............................. 360/99.08

*Primary Examiner*—John H. Wolff
*Attorney, Agent, or Firm*—Guy W. Shoup; Paul J. Winters; Norman R. Klivans

[57] ABSTRACT

A disk rotatably driving device which has a disk of a magnetic material and a turntable formed with an element base on the upper surface of the disk, fixed to a rotatably driving shaft, a pole section formed on the element base for magnetically attracting the hub of a magnetic material formed at the center of the disk, a driving pin fixed to one end of a leaf spring fixed to the lower surface of the turntable, projected from the through hole of the turntable to rotatably drive the hub, and a nonmagnetic pole formed at a predetermined position of the element base at an axially symmetrical position with respect to the through hole thereof. Thus, the magnetic balance is improved to prevent a chucking mistake from occurring in a simple structure by providing the nonmagnetic pole of substantially the same shape as the through hole for the driving pin at the element base at an axially symmetrical position with respect to the through hole.

2 Claims, 5 Drawing Sheets

CHUCKING MECHANISM FOR FLOPPY DISK DRIVE

BACKGROUND OF THE INVENTION

1. FIELD OF THE INVENTION

This invention relates to a device for rotatably driving a small-sized disk, such as a 3.5-inch floppy disk by supporting the disk and, more particularly, to a disk rotatably driving device in which a load caused by engaging a driving pin when chucking the hub at the center of the disk is reduced.

2. DESCRIPTION OF THE PRIOR ART

FIGS. 7 to 9 show a floppy disk rotatably driving device provided in a conventional 3.5-inch floppy disk driving unit.

In FIGS. 7 to 9, reference numeral 1 designates a rotatably driving shaft. The driving shaft 1 is rotatably driven by a brushless DC motor. A circular turntable 2 is fixed to the upper end of the driving shaft 1, and the upper end 1a of the driving shaft 1 is projected upward from the center of the turntable 2. The turntable 2 is composed of a disk 2a made of a ferromagnetic material, and an element base 2b having a peripheral pole section M formed on the disk 2a. A slider plate 4 made of synthetic resin is fixed to the center on the upper surface of the turntable 2. A through hole A is formed at the turntable 2, and a driving pin 5 fixed to the end 3a of a leaf spring 3 fixed to the lower surface of the turntable 2 is projected via the through hole A from the upper surface of the turntable 2.

Reference numeral 6 in FIG. 7 designates a hub fixed to the center of a disk 7 inserted to between the upper side 8a and the lower side 8b of a disk cartridge 8. In case of 3.5-inch floppy disk, the hub 6 is made of a thin metal plate, and, as shown in FIG. 9, a central hole 6a of substantially square shape is perforated at the center, and a driving hole 6b of substantially rectangular shape is perforated at a position separated at a predetermined distance from the ceneteral hole 6a.

As shown in FIG. 9, when the hub 6 is mounted on the rotating turntable 2, the driving pin 5 is, for example, slid on the lower surface of the hub 6 at a position (a), the end 3a of the leaf spring 3 is deflected downward at this time, and the driving pin 5 is moved backward from the upper surface of the turntable 2. When the turntable 2 is rotated so that the driving pin 5 is inserted into the driving hole 6b of the hub 6 to arrive, for example, at a position (b), the driving pin 5 is projected from the upper surface of the turntable 2 and inserted into the driving hole 6b of the hub 6 by the elastic force of the end 3a of the leaf spring 6. When the turntable 2 is further rotated, the driving pin 5 is first contacted with the outer side 6c of the driving hole 6b of the hub 6, and then contacted with the front side 6d while contacting with the outer side 6c of the driving hole 6b during the slight inclination toward the center. The hub 6 is positioned radially in the rotating direction with respect to the turntable to be rotatably driven at a position (c).

However, in such a conventional disk rotatably driving device, a force for magnetically attracting the hub 6 of the disk is weakened at the periphery of the driving pin 5 to collapse the magnetic balance since the pole section M of the element base 2b of the turntable 2 is formed over the entire periphery as shown in FIG. 8. For example, when the hub 6 of the disk is chucked at the position (a) in FIG. 9, the magnetically attracting force is weak at the periphery of the through hole A of the element base 2b as shown in FIG. 10 and the opposite side of the hub 6 might be accordingly contacted fixedly with the pole section M of the element base 2b in the state that the driving pin 5 is not completely depressed. When the turntable 2 tends to rotate in this state, the hub 6 is rotated together with the rotation of the turntable 2 since the magnetically attracting force of the contacting portion is strong. (Since the hub 6 is attracted through the slider plate 4 in a normal state (FIG. 7), it does not rotate together with the turntable 2, but slides on the slider plate 4.) In other words, the chucking operation is mistaken to rotate the hub 6 irrespective of the rotatably driving force of the driving pin 5. When this chucking mistake occurs, the initial position of recording and reproducing on the disk 7 is in error to reduce the recording and reproducing accuracy.

SUMMARY OF THE INVENTION

Accordingly, an object of this invention is to provide a disk rotatably driving device which can eliminate the above-mentioned drawbacks and in which a magnetic balance is improved to prevent a chucking mistake from occurring in a simple structure by providing a nonmagnetic pole of substantially the same shape as a through hole for a driving pin at an element base at an axially symmetrical position with respect to the through hole.

In order to eliminate the above-mentioned drawbacks, there is provided according to the present invention a disk rotatably driving device in which a nonmagnetic pole of substantially the same shape as a through hole for a driving pin is formed at an element base at an axially symmetrical position with respect to the through hole.

The above-mentioned technical means operates as below.

The balance of a force for magnetically attracting the hub of the disk is improved by providing the nonmagnetic pole of substantially the same shape as the through hole for the driving pin at the element base at the axially symmetrical position with respect to the through hole to prevent the chucking mistake.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Figure 1:
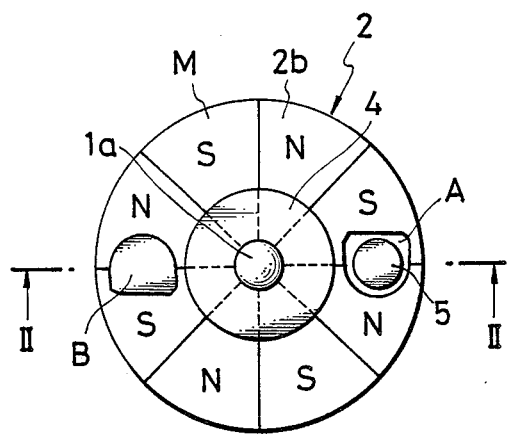
FIG. 1 is a plan view showing a turntable of a disk rotatably driving device according to an embodiment of the present invention.

Embodiments of the present invention will be described in detail with reference to the accompanying drawings, wherein the same reference numerals as those in the conventional example indicate the same or equivalent components, and detailed description thereof will be omitted.

Figure 2:
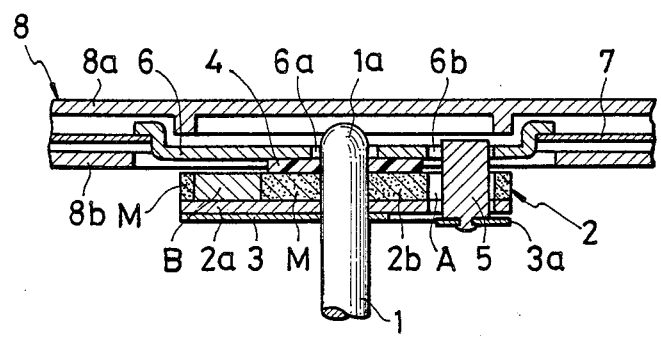
FIG. 2 is a sectional view of the state that a disk is chucked with the turntable of FIG. 1, taken along the line II—II in FIG. 1.

FIG. 1 is a plan view showing a pole section formed on an element base of a turntable of a 3.5-inch floppy disk rotatably driving device according to the present invention, and FIG. 2 is a sectional view of the state that a disk is chucked with the turntable of FIG. 1, taken along the line II—II in FIG. 1.

The construction will be first described. A circular turntable 2 is fixed to the upper end of a rotatably driving shaft 1 rotatably driven by a brushless DC motor in the same manner as the construction of the conventional device. A pole section M formed on an element base 2b of the turntable 2 is formed, as shown in FIG. 1, except a through hole A and a nonmagnetic pole B at the axially symmetrical position with respect to the through hole A.

Figure 9:
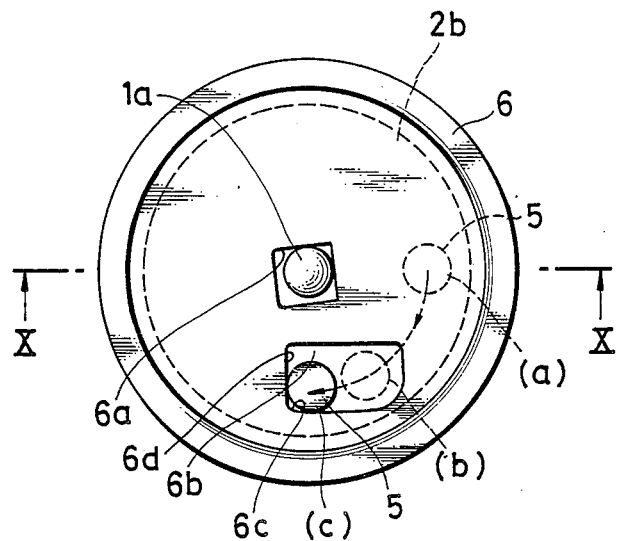
FIG. 9 is a plan view of FIG. 7.
Figure 10:
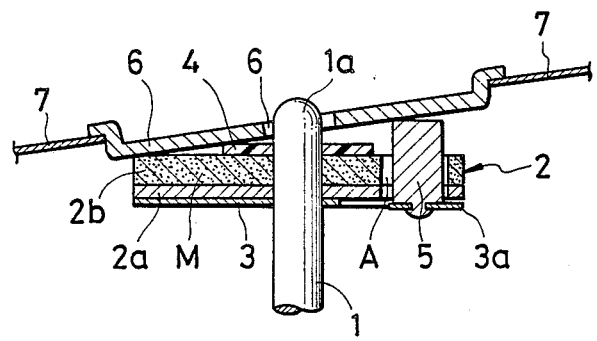
FIG. 10 is a sectional view taken along the line X—X of FIG. 9.

The chucking state of the hub 6 of a disk 7 in the state (a) in FIG. 9 does not become the state as shown in FIG. 10 since the magnetically attracting force is weak at the through hole A and the nonmagnetic pole B, ut becomes a normal chucking state as shown in FIG. 2 by the magnetically attracting force of the pole section M symmetrical at the upper and lower portions in FIG. 1 by providing the nonmagnetic pole B at the element base 2b of the turntable 2. Thus, the chucking mistake can be prevented.

Figure 3:
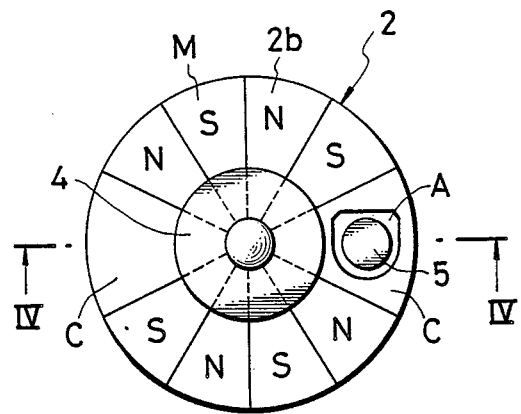
FIGS. 3 and 4 are views showing a second embodiment.
Figure 4:
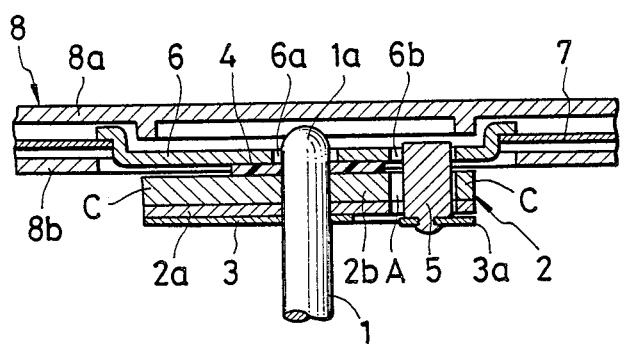

In FIGS. 3 and 4, a second embodiment is shown.

In this embodiment, a nonmagnetic pole of of an element base 2b of a turntable 2 is formed in a sector shape to expand from the center of its axis radially to cover a through hole A, and the sector-shaped nonmagnetic pole C is also provided similarly at the axially symmetrical position to improve the balance of the magnetically attracting force.

Figure 5:
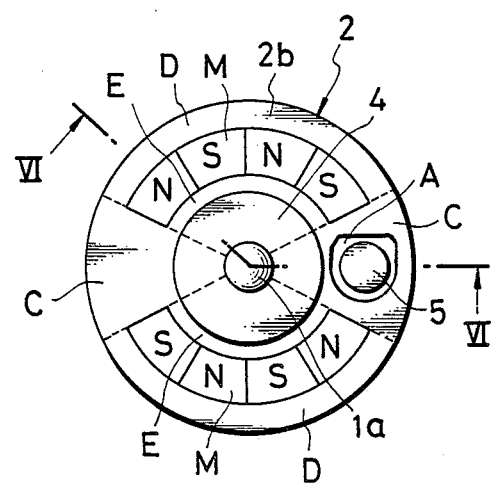
FIGS. 5 and 6 are views showing a third embodiment.
Figure 6:
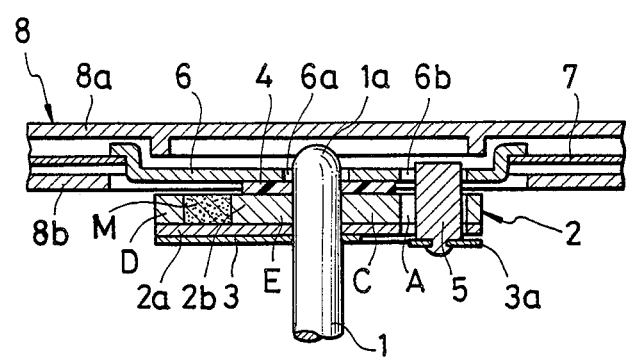
Figure 7:
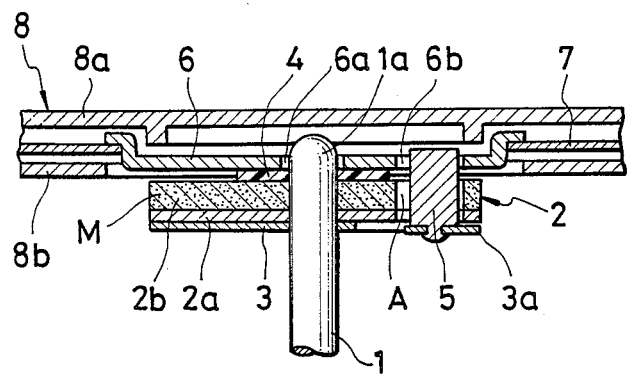
FIG. 7 is a sectional view showing the state that the disk is chucked in a conventional disk rotatably driving device.
Figure 8:
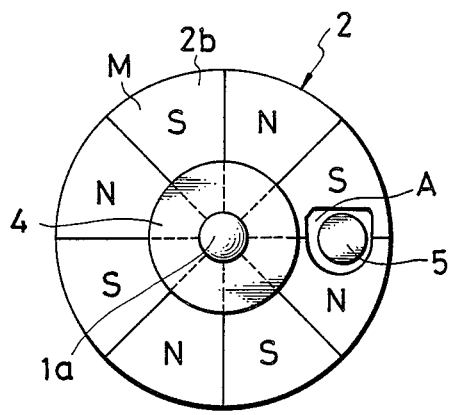
FIG. 8 is a plan view of the turntable of FIG. 7.

In FIGS. 5 and 6, a third embodiment is shown.

In this embodiment, nonmagnetic poles of an element base 2b of a turntable 2 is also formed, in addition to a sector-shaped nonmagnetic pole C of FIG. 3, at the outer periphery D and the inner periphery E of the element base 2b of the turntable 2 to eliminate the leakage of the magnetic flux from the turntable 2. Thus, the magnetic flux of the pole section M can be effectively used to magnetically attract the hub 6 of the disk 7, and no leakage magnetic flux can prevent the adverse influence to the disk 7.

According to this invention as described above, the nonmagnetic pole of substantially the same shape as the through hole for the driving pin is formed at the pole section formed on the element base to chuck the hub of the disk. Therefore, the magnetic flux for chucking the hub is not irregular to prevent the chucking mistake. Further, the outer and inner peripheries of the element base are formed in nonmagnetic poles to effectively use the magnetic flux only for the magnetically attracting force and to prevent a leakage magnetic flux.

What is claimed is:

1. A chuckning mechanism for a magnetic disk cartridge comprising:
    a turntable including a magnetic disk mounted on a base, said base being provided with plural magnetic pole sections of reversed polarity for magnetically attracting a hub of the magnetic disk cartridge;
    a rotary driving shaft fixed to said base;
    a driving pin installed at an end of a leaf spring fixed to a lower surface of said magnetic disk, said driving pin projecting upwardly out of a through hole defined by said base and said magnetic disk, so as to chuck said hub and rotationally drive said hub;
    wherein said base includes at least a first non-magnetic portion having a perimeter substantially similar in shape to a perimeter of said through hole and located so as to be radially offset 180° out of phase with said through hole.

2. The device of claim 1, further comprising a second non-magnetic portion of said base adjacent to said through hole and having a particular perimeter shape, and a third non-magnetic portion of said base adjacent to said first non-magnetic portion having a perimeter substantially similar in shape to that of said second non-magnetic portion.

* * * * *

UNITED STATES PATENT AND TRADEMARK OFFICE
CERTIFICATE OF CORRECTION

PATENT NO. : 4,896,232

DATED : January 23, 1990

INVENTOR(S) : Katsuyuki Sugawara

It is certified that error appears in the above-identified patent and that said Letters Patent is hereby corrected as shown below:

Col. 4, line 21 - Claim 1, "chuckning" should read --chucking--

Signed and Sealed this

Twenty-sixth Day of February, 1991

Attest:

HARRY F. MANBECK, JR.

*Attesting Officer*     *Commissioner of Patents and Trademarks*